(12) United States Patent
Patterson, III et al.

(10) Patent No.: US 10,235,044 B2
(45) Date of Patent: Mar. 19, 2019

(54) SYSTEM AND METHODS FOR STORAGE DATA DEDUPLICATION

(71) Applicant: Datrium, Inc., Sunnyvale, CA (US)

(72) Inventors: R. Hugo Patterson, III, Los Altos, CA (US); Sazzala Reddy, Los Altos, CA (US); Vijayan Prabhakaran, Los Gatos, CA (US); Garrett Smith, San Francisco, CA (US); Lakshmi Narayanan Bairavasundaram, San Jose, CA (US); Ganesh Venkitachalam, Palo Alto, CA (US)

(73) Assignee: Datrium, Inc., Sunnyvale, CA (US)

( * ) Notice: Subject to any disclaimer, the term of this patent is extended or adjusted under 35 U.S.C. 154(b) by 307 days.

(21) Appl. No.: 15/177,342

(22) Filed: Jun. 9, 2016

(65) Prior Publication Data

US 2017/0031994 A1    Feb. 2, 2017

Related U.S. Application Data

(60) Provisional application No. 62/197,537, filed on Jul. 27, 2015.

(51) Int. Cl.
*G06F 17/30* (2006.01)
*G06F 3/06* (2006.01)

(52) U.S. Cl.
CPC .......... *G06F 3/06* (2013.01); *G06F 17/30371* (2013.01); *G06F 17/30489* (2013.01); *G06F 17/30598* (2013.01); *G06F 17/3048* (2013.01); *G06F 17/30312* (2013.01)

(58) Field of Classification Search
CPC ................ G06F 3/06; G06F 17/30598; G06F 17/30489; G06F 17/30371; G06F 17/3048; G06F 17/30312
See application file for complete search history.

(56) References Cited

U.S. PATENT DOCUMENTS

| 8,135,683 | B2* | 3/2012 | Douglis .................. H03M 7/30 707/693 |
| 8,601,473 | B1* | 12/2013 | Aron .................... G06F 9/45533 709/223 |
| 8,959,155 | B1* | 2/2015 | Kwok .................... H04L 69/04 709/205 |
| 9,189,402 | B1* | 11/2015 | Smaldone ............. G06F 12/121 |
| 9,395,929 | B2* | 7/2016 | Bojinov ................ G06F 3/0622 |
| 9,424,185 | B1* | 8/2016 | Botelho ............... G06F 12/0253 |
| 9,448,927 | B1* | 9/2016 | Agarwala ........... G06F 12/0253 |
| 9,594,674 | B1* | 3/2017 | Mondal ............... G06F 12/0269 |
| 9,715,505 | B1* | 7/2017 | Mondal ............. G06F 17/30138 |

(Continued)

*Primary Examiner* — Huawen A Peng
(74) *Attorney, Agent, or Firm* — Hickman Palermo Becker Bingham LLP

(57) ABSTRACT

Data in a storage system is deduplicated after receiving from at least one writing entity requests for a plurality of write operations for a corresponding plurality of data blocks in a storage object. The received blocks are buffered and sorted in order and a sequence of clumps is created from the buffered blocks, where each clump comprises a grouping of at least one of the sorted, buffered blocks. A boundary is determined between at least one pair of clumps based at least in part on the content of at least one of the buffered blocks, and it is then determined whether at least one of the clumps is a duplicate of a previously stored clump.

54 Claims, 5 Drawing Sheets

(56) References Cited

U.S. PATENT DOCUMENTS

| | | | |
|---|---|---|---|
| 9,720,619 B1* | 8/2017 | Shah | G06F 12/0253 |
| 2006/0218360 A1* | 9/2006 | Burkey | H04L 67/1095 |
| | | | 711/154 |
| 2009/0259701 A1* | 10/2009 | Wideman | G06F 17/30138 |
| 2013/0018932 A1* | 1/2013 | Bhaskar | H03M 7/3088 |
| | | | 708/203 |
| 2014/0172795 A1* | 6/2014 | Teng | H03M 7/30 |
| | | | 707/634 |
| 2016/0283372 A1* | 9/2016 | Davis | G06F 12/0261 |

* cited by examiner

FIG. 4

Snap 1 deleted; clumps re-packed; snaps to die in order active clumps: cl12 [0,1,2,3,4]  cl13 [6,7,8,9]  cl14 [10,11]  cl15 [12,13,14,15,16]  cl16 [17,18,19]  cl4 [20,21,22,23]  cl18 [26,27]  cl11 [28,29]

Clump dies with Snap 2: cl19 [8,14,17]

Clump dies with Snap 3: cl20 [17,18,28,29]

Dead blocks: [2, 8, 11, 19]

Unwritten to blocks: [5, 24, 25]

FIG. 5A
DMap at end of snap 4

| LBA | Snap ID | Reference |
|---|---|---|
| 0 | 1 | <cl1, 0> |
| 1 | 1 | <cl1, 1> |
| 2 | 1 | <cl1, 2> |
| 2 | 2 | <cl5, 0> |
| 3 | 1 | <cl1, 3> |
| 4 | 1 | <cl1, 4> |
| 6 | 4 | <cl10, 0> |
| 7 | 1 | <cl2, 0> |
| 8 | 1 | <cl2, 1> |
| 8 | 2 | <cl5, 1> |
| 8 | 3 | <cl7, 0> |
| 9 | 1 | <cl2, 2> |
| 10 | 1 | <cl3, 0> |
| 11 | 1 | <cl3, 1> |
| 11 | 2 | <cl5, 2> |
| 12 | 2 | <cl6, 0> |
| 13 | 2 | <cl6, 1> |
| 14 | 2 | <cl6, 2> |
| 14 | 3 | <cl7, 1> |
| 15 | 3 | <cl7, 2> |
| 16 | 3 | <cl7, 3> |
| 17 | 1 | <cl3, 2> |
| 17 | 3 | <cl7, 4> |
| 17 | 4 | <cl10, 1> |
| 18 | 1 | <cl3, 3> |
| 18 | 4 | <cl10, 2> |
| 19 | 1 | <cl3, 4> |
| 19 | 2 | <cl6, 3> |
| 20 | 1 | <cl4, 0> |
| 21 | 1 | <cl4, 1> |
| 22 | 1 | <cl4, 2> |
| 23 | 1 | <cl4, 3> |
| 26 | 3 | <cl8, 0> |
| 27 | 3 | <cl8, 1> |
| 28 | 3 | <cl8, 2> |
| 28 | 4 | <cl11, 0> |
| 29 | 3 | <cl9, 0> |
| 29 | 4 | <cl11, 1> |

FIG. 5B
DMap after snap 1 deleted, and clumps repacked

| LBA | Snap ID | Reference |
|---|---|---|
| 0 | 1 | <cl12, 0> |
| 1 | 1 | <cl12, 1> |
| 2 | 2 | <cl12, 2> |
| 3 | 1 | <cl12, 3> |
| 4 | 1 | <cl12, 4> |
| 6 | 4 | <cl13, 0> |
| 7 | 1 | <cl13, 1> |
| 8 | 2 | <cl19, 0> |
| 8 | 3 | <cl13, 2> |
| 9 | 1 | <cl13, 3> |
| 10 | 1 | <cl14, 0> |
| 11 | 2 | <cl14, 1> |
| 12 | 2 | <cl15, 0> |
| 13 | 2 | <cl15, 1> |
| 14 | 2 | <cl19, 1> |
| 14 | 3 | <cl15, 2> |
| 15 | 3 | <cl15, 3> |
| 16 | 3 | <cl15, 4> |
| 17 | 1 | <cl19, 2> |
| 17 | 3 | <cl20, 0> |
| 17 | 4 | <cl16, 0> |
| 18 | 1 | <cl20, 1> |
| 18 | 4 | <cl16, 1> |
| 19 | 2 | <cl6, 2> |
| 20 | 1 | <cl4, 0> |
| 21 | 1 | <cl4, 1> |
| 22 | 1 | <cl4, 2> |
| 23 | 1 | <cl4, 3> |
| 26 | 3 | <cl18, 0> |
| 27 | 3 | <cl18, 1> |
| 28 | 3 | <cl20, 2> |
| 28 | 4 | <cl11, 0> |
| 29 | 3 | <cl20, 3> |
| 29 | 4 | <cl11, 1> |

SYSTEM AND METHODS FOR STORAGE DATA DEDUPLICATION

CROSS-REFERENCE TO RELATED APPLICATIONS

This application claims priority of U.S. Patent Application 62/197,537, filed 27 Jul. 2015.

BACKGROUND

Data deduplication is a well-known technique for reducing storage needs by replacing redundant instances of data units with some form of pointer to a single, or at most fewer, stored instances. As is usually the case, the benefit of greater storage efficiency through reduced redundancy comes at a cost, in the form of a decision: the smaller the granularity of the data units, the less overhead is incurred when a particular data unit is changed, but the more pointers must be stored and made accessible unambiguously (avoiding hash collisions, for example).

Although the need for efficient deduplication arises in many contexts, data redundancy is particularly common in virtualized computer systems, especially where several virtual machines (VMs) with similar configurations run on a common host and may even be cloned. Virtual machine file systems tend to use block sizes of 4K or 8K, and almost all writes are multiples of that block size. Such writes to random locations within the VM's virtual disk (vDisk) are a challenge to whatever system is used to manage them efficiently. This is particularly true in the case of a distributed storage system, in which there will typically be many physically separate storage nodes, some of which may have different numbers and types of storage devices, and some or all of which may be remote. The most straightforward approach is to manage and address each block individually. In a fingerprint-based deduplication ("dedupe") storage system, the references to data are fingerprints, for example, hash values, and an index maps from each data fingerprint to its corresponding storage location so that the correct data can be found to respond to a read request. If the fingerprint (FP) index maintains an entry for every block in the system, the index can be quite large. If, for example, the FP is a 20-byte SHA1 hash and stored data is compressed 2:1, the index could easily be more than 10 GB per TB of storage capacity. With disk drive capacity already around 8 TB, the index can require a lot of expensive RAM.

Previous systems, for example, those provided by Data Domain, addressed this problem with specialized data and index layouts, but these technologies work well only for their intended use case of streaming sequential backup data. Primary storage workloads often require random accesses that do not work well with those techniques. What is needed is an approach that allows the index to reside in RAM, but does not require too much expensive RAM. It is of course possible to focus on optimizing the footprint of the index itself, but this still fails to significantly reduce the number of entries that need to be indexed.

A straightforward approach to reducing the number of fingerprint entries would be to index larger blocks, which are sometimes called "extents" because they include a range of logically contiguous blocks. For example, the first 64 KB extent would include the first sixteen 4 KB blocks, the second extent, the next 16 blocks, and so forth. Larger extents mean fewer extents and therefore fewer index entries and a smaller index. A downside of extents, for example, of 64 KB, is that a 4 KB write of a single VM file system block would cause a read-modify-write of the larger 64 KB extent. Such larger writes could have a significant performance impact. Further, in a system that maintains snapshots, both the old and new 64 KB would need to be retained even though they differed in only 4 KB out of the 64 KB. Thus, the space efficiency of such snapshots could be very poor, making it more expensive to retain large numbers of snapshots. Further, such extents do not, in general, correspond to semantically related data such as a file and instead may include unrelated and arbitrary sets of blocks. These arbitrary combinations of blocks in an extent are unlikely to be repeated in exactly the same way. This reduces the effectiveness of deduplication, which identifies exact copies of the same data stored multiple times. When extents are not fully identical, deduplication cannot optimize the data stored.

DESCRIPTION OF DRAWINGS

FIG. 4 illustrates clump re-packing, as well as block and clump deletion and expiration.

FIGS. 5A and 5B show two phases of a simplified example of a Deduped Clump Layout map when stored as a flat set of key-value pairs.

DESCRIPTION OF THE INVENTION

The novel procedures and structures for deduplication (deduping) are described in detail below. Before that, however, the system context in which the invention will typically be implemented is first illustrated and described.

Figure 1:
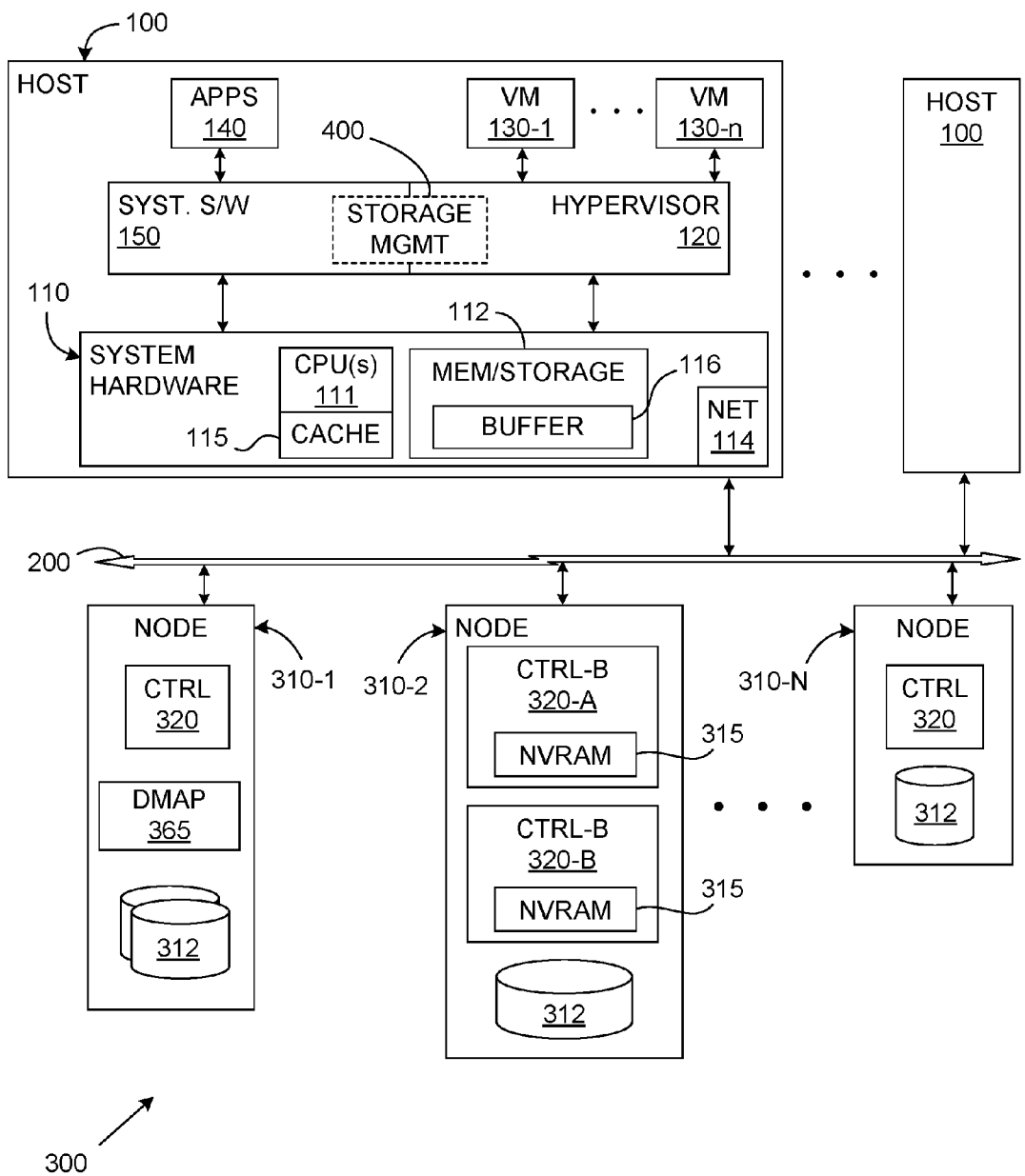
FIG. 1 illustrates the main hardware and software components of a distributed storage system.

FIG. 1 illustrates the main components of a basic embodiment of the invention, in which one or more hosts write data to one or more storage devices, which may be local to the hosts, or remote, or both. Each of one or more host platforms 100, which may, and typically will be, servers, includes system hardware 110, including one or more processors (CPU's) 111, and some device(s) 112 for non-persistent, volatile and/or persistent, non-volatile, non-transitory storage. The line between what is a "storage device" and "memory" is no longer as bright as it once was, however (consider SSD and NVRAM technologies, for example) and the embodiments described here do not presuppose such a distinction.

The hardware 110 will also include other conventional mechanisms such as a network connection device 114 for transfer of data between the various components of the system and one or more network(s) 200, which may be any known public or proprietary local or wide-area network such as the Internet, an internal enterprise network, etc. Note that, depending on the implementation and nature of the system, the host(s) may even communicate with external entities, such as storage nodes 300, over different networks, thereby allowing some parallel operations. The only requirement is that, whatever network(s) is/are used, the host 100 should be able to transmit and receive data to and from the nodes 300 it needs to access. "The" network 200 is therefore to be read as the collection of whichever networks are implemented, along with any necessary switching or other communications devices if data needs to pass between different networks.

One or more caches 115 may also be included. As is well understood, the system may cache selected data, for example, frequently accessed data units, or data units expected to be needed soon, so as to reduce access delay and improve efficiency. Part of the memory/storage 116 may also be designated and used as one or more buffers, for example, to buffer writes.

The host will also include conventional system software 150 such as, depending on the implementation, an operating system (OS) which includes a storage management software module 400, device drivers, etc. User-level applications 140 may then run in the known manner on the system software. If a host supports a virtualization platform, it will typically include some form of hypervisor 120, which forms the interface layer between the system hardware 110 and (in the illustrated embodiment) at least one virtual machine (VM) 130-1, . . . , 130-n.

As is well known, a VM is a software abstraction of an actual physical computer system, including virtual memory and virtual disk storage, typically with one or more levels of intermediate address mapping from the VM's address space to the address space managed by the actual host operating system. The VMs are shown in FIG. 1 as being within the host merely for simplicity—in most implementations, a virtual machine is a "guest" that is running on the hypervisor/hardware host. In some virtualized systems, a "virtual machine monitor" is included as an interface to underlying software layers, such as the hypervisor or a host OS. Many hypervisors, such as the ESX Server family of products of VMware, Inc, run directly on "bare metal", that is, directly on the system hardware 110, and themselves include some of the software components that in other systems are part of the system software 150. In other virtualization platforms, the hypervisor may run on or at the same level as the host OS, which supports and performs some operations upon calls from the hypervisor. The various embodiments of the invention described here do not depend on any particular virtualization architecture, whether for the VMs, the hypervisor(s) or other virtualization layers. Indeed, the invention does not presuppose VMs at all.

In embodiments of this invention, when an application or VM wants to save data persistently, it may write the data via, respectively, the system software 150 or hypervisor 120 to the storage management module 400, which processes the data for storage (see below for details) and forwards the processed data to other modules that actually write the data to a chosen persistent storage device, which may be local to the host or in a remote storage node. The storage management software module may also update metadata that enables it to retrieve the correct data at a later time in response to a read request from an application or VM.

The nodes 310-1, 310-2, . . . , 310-N represent respective storage entities. Although not illustrated (merely for the sake of simplicity), each node will typically include one or more processors, as well as non-transitory, volatile or non-volatile storage for the executable code that the processor(s) execute to perform the steps used to implement embodiments of this invention. Each node will typically include one or more persistent storage devices 312 such as, for example, a disk drive, flash SSD, etc., as well as some form of storage controller 320, 320-A, 320-B, which includes controller software. Depending on other design considerations, nodes may include either a single controller (such as the illustrated 310-1 and 310-N), or multiple controllers (such as shown for 310-2). Controllers may include their own local high-speed storage such as NVRAM 315 available, for example, for local caching or caching for hosts or other nodes. In multi-controller nodes (310-2), each controller preferably includes a conventional high-speed communication link between the controllers. Even other implementations will typically have some form of controller, or at least controller software, which may be an operating system, or control software for some specialized hardware device within the node. From the perspective of the hosts, the collection of nodes may form a single yet distributed storage system, that is, a storage pool 300.

For succinctness, the main aspects of the invention are referred to in this disclosure as the Deduped Clump Layout (DCL). Although the techniques described below may be applied in other contexts as well, for the purpose of illustration they are described with relation to use in the DVA system created by Datrium, Inc., illustrated generally in FIG. 1. Below, for generality, the distributed virtual array (or whatever storage system the invention is implemented in) is abbreviated "DVX".

Furthermore, features of embodiments of the invention are described below primarily with reference to use with VM virtual disks, that is vDisks. This is by way of example only—the invention may also be used to advantage with files for processes, block storage logical units (such as Logical Unit Numbers—LUNs), etc., and with any form of writing entity, virtualized or not.

Figure 2:
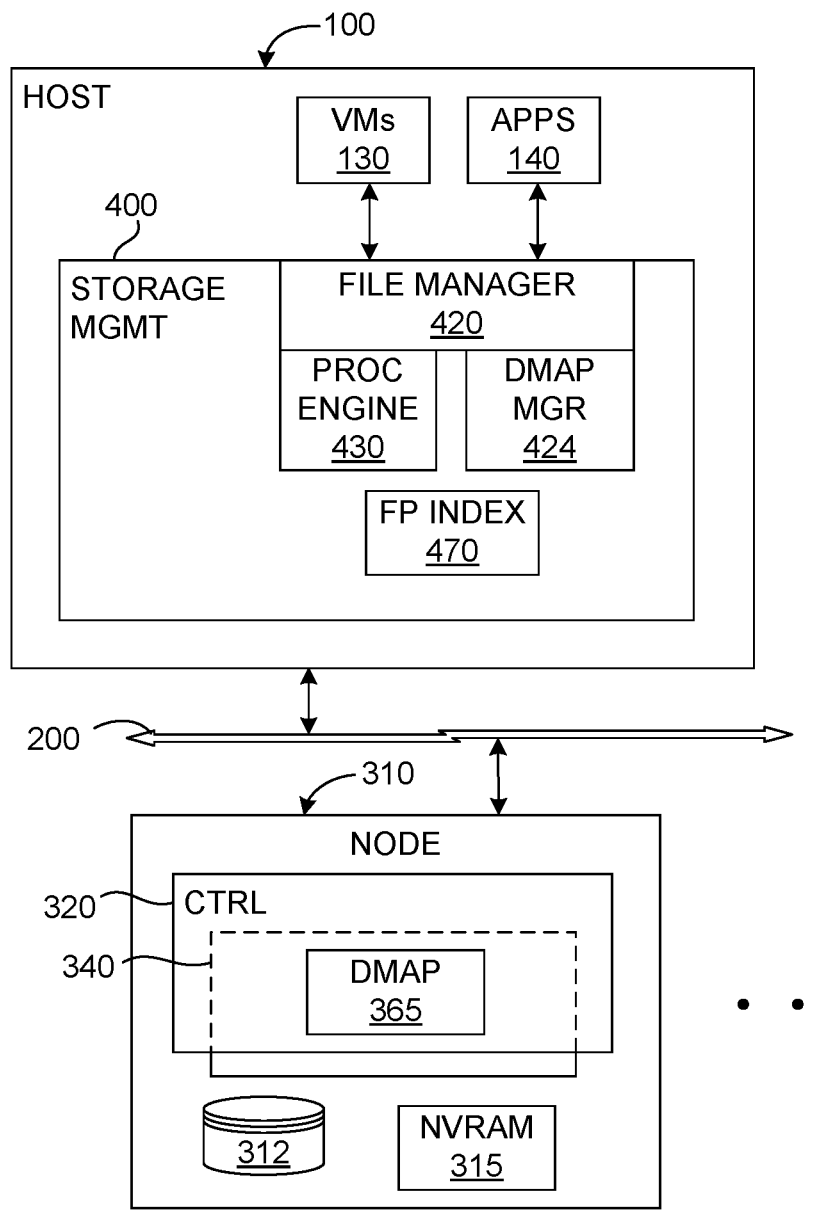
FIG. 2 shows storage management components in greater detail.

FIG. 2 illustrates components of the host's Storage Management software module 400 and a corresponding node storage management node software module 340. These components are illustrated as separate for the sake of clarity, but as skilled programmers will understand, some may be combined into single code modules, or further subdivided into separate sub-routines.

A file manager 420 may be included to receive written data from an application 140 or VM 130, which it stores as blocks. In this description, a "block" is the minimum logical unit of the storage system, which may comprise any number of data bytes. These first, minimum storage units (that is, blocks) are then packed into second, larger units, referred to here as "clumps", which may then be stored together in even larger, third, writable container units. Currently, blocks have a uniform size of 4 KB or 8 KB; these are used here as an example.

In some embodiments, a processing engine 430 may be included to compress newly written file system blocks and to buffer them until the application or VM writes multiple such blocks. Eventually, as described further below, it packs multiple such compressed blocks into "clumps", whose total compressed size may be in the range of, for example, 32 KB to 64 KB or larger, which then may form a new fundamental unit of data storage. In the preferred embodiment, the number of blocks in a clump is not uniform and instead may vary from clump to clump. The processing engine may also compute a fingerprint, that is, unique identifying information, for each clump. In the preferred embodiment, this fingerprint is derived from fingerprints of the individual blocks comprising the clump. The system may then use this fingerprint as a reference for the clump and stores the fingerprint in a fingerprint index 470, which may be located within the host, as illustrated, in a storage node, or in any other chosen storage location. One example of a possible fingerprinting technique is hashing, such as using any of the SHA methods (for example, SHA-1). Assuming that the chosen fingerprinting method is sufficiently collision resistant (that is, the probability of two different inputs yielding the same fingerprint output is sufficiently low), different data blocks having the same fingerprint may then be presumed to have the same content and therefore be duplicates.

The clumps formed as part of the write process, in general, include only newly written blocks, preferably sorted in Logical Block Address (LBA) order, but not necessarily blocks that are contiguous in the LBA space. Unlike extents, clumps do not, in general, need to have any correspondence to an LBA range within a virtual disk, file, or any other type of storage object stored in the DVX. Instead, clumps are created in a manner that increases the likelihood that different parts of the system will independently create identical clumps that can then be deduplicated to optimize storage capacity.

For example, in a conventional extent-based system with 4-block extents, extent E1 would consist of blocks (B0, B1, B2, and B3) corresponding to the data blocks stored with LBAs 0 . . . 3. Extent E2 would consist of blocks (B4, B5, B6, and B7). If block B1 were overwritten with new block B1', an extent based system would read the old extent E1, substitute B1' for B1 to create a new version of E1 which we can call E1' which would then consist of blocks (B0, B1', B2, and B3). If blocks B3, B4, and B6 were similarly overwritten with B3', B4', and B6', the extent-based system would write out E1' with (B0, B1', B2, B3') and E2' with (B4', B5, B6', B7).

In contrast, embodiments of the disclosed clump-based system may create a single new clump with blocks (B1', B3', B4', and B6') and store that. It would not need to write out unchanged blocks B0, B2, B5, or B7 again. Note that the newly created clump may not consist of blocks with sequentially numbered LBAs the way the extents do. Using the DCL, clumps of blocks may be used as the unit of data management, including deduplication. The system generates a fingerprint (FP) for the clump which serves as the reference for the clump.

A DMap manager 424 may be included for maintaining a metadata structure that records, for each LBA, the corresponding clump and block that stores the current contents of the block. The DMap may be implemented as a map from LBA to clump and block for a virtual disk. The DMap's (see below) block references are to clump and block number within the clump. The FP index may need to include only an entry for the entire clump and not necessarily an entry for each block. Clumps may be much bigger than blocks, such that the clump index may be an order of magnitude smaller than would be needed for an index of every block; moreover, most or all of the FP index may fit in RAM.

In the preferred embodiment, DMap metadata, like the data clumps themselves, may be stored in containers striped across a plurality of storage nodes. The DMap may be stored in any preferred medium in any suitable location. The DMap manager need not reside with its metadata. It may reside on the host, as shown in 424, or it may be implemented as a DMap service running on a storage node, indicated as module 365 in node 310-1.

In DCL, deduplication is done at the clump level: Duplicate clumps are identified and may be eliminated. Deduplication of individual blocks would in many cases further reduce the amount of data that needs to be stored, but, block-level deduplication may be more expensive because of the larger index required. The content of the virtual disk, file, or object is preferably included in the set of all referenced clumps. The system may prefetch this set of clumps into a host cache so that future reads of the blocks in the clumps can be serviced from the cache and avoid an access to a remote storage node. Prefetching clumps is much more efficient than prefetching a much larger number of individual blocks because there is an access overhead associated with every fetch. Replication of data may also operate at the clump level, without needing to process individual blocks. Garbage collection in the log-structured DVX file system may also be kept at the clump granularity. Finally, the cache may be clump-based in the sense that clumps are fetched, retained, and evicted as a unit. Essentially, the DVX file system preferably operates at the clump level. Such operation can be much more efficient than block-level operation because the smaller number and larger size of the clumps.

Because clumps are fingerprinted, they are immutable. If the contents of a block were to change, the fingerprint for the clump would change and there would be a new clump with a new fingerprint. Over time, blocks in clumps will be logically overwritten. The new blocks will be in new clumps, but the logically overwritten blocks will effectively "die" or "expire", that is, there will no longer be any references to them. Sometimes this is called fragmentation. The DVX system may therefore implement a clump-repacking process that collects the live blocks from different clumps and repacks them together into new clumps. The system can then garbage collect, or reclaim, the space used by the now completely unneeded clumps. Because the references to data will typically include the clump fingerprint, it is easy to tell just by scanning the DMap which blocks are organized with good locality and which aren't. This makes proactive repacking to reduce cache misses possible.

DCL Clump Creation and Repacking

In one implementation, the DCL initially creates clumps through the following process: Writes to a vDisk first go to the on-host write buffer 116, which may be in host RAM or flash or a combination of locations. (The new writes may also, or alternatively, be sent to one or more of the external storage nodes 300 and its NVRAM so that the data are not lost in the event that the host fails.) A write-back process may then read data from the host's write buffer 116 and clump blocks together in logically sorted, but not necessarily sequentially contiguous, order. New writes, even logical overwrites of previously written data, go through the same process and end up in new clumps. These overwrites create fragmentation and the blocks left over in old clumps may need to be reorganized into new clumps. This section describes this process in more detail.

Figure 3:
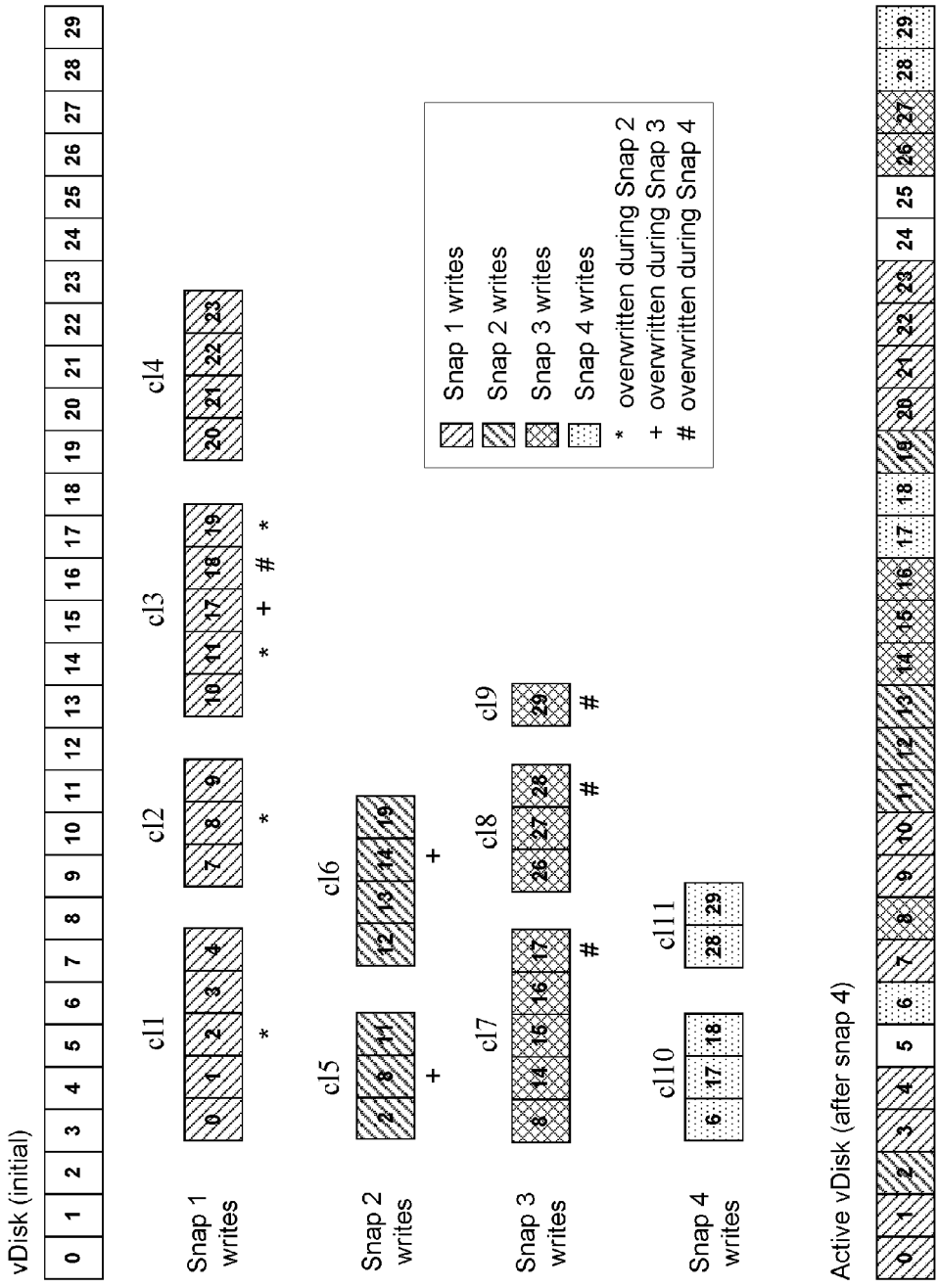
FIG. 3 illustrates a method of clump creation.

FIG. 3 shows clumps created for new writes. The top row of the figure shows data blocks with LBAs numbered 0 . . . 29 for an initial state (for this example, having no shading or hatching) of a "miniature" vDisk example. Writes may be processed continuously, or be grouped into buffered "batches". In some cases, multiple writes may be naturally grouped or otherwise separated into distinct time periods, such as, for example, when the system takes a state snapshot, such as of a VM. This example of snapshots is used here by way of illustration. In FIG. 3, shading and hatching are used to indicate the time period during which the individual blocks were most recently written, in this example, snapshot ("snap") 1, 2, 3, or 4. The blocks written during snap 1 include all those blocks written up to the creation of snapshot 1. The snap 2 writes include all those blocks written after the creation of snapshot 1 up to the creation of snapshot 2. As illustrated, the blocks and clumps therefore don't "belong" to snap 1 or 2, but rather they were written in the time period leading up to snap 1, 2, 3, or 4, respectively. A block written during snap 1 is part of every subsequent snap until it is overwritten. In the illustrated example, the unshaded blocks 5, 24, and 25 have never been written to; they remain uninitialized.

In FIG. 3, a "*" under a block indicates that there is another write to the same LBA, in other words, the block is logically overwritten by a subsequent write. A "+" under a block indicates overwriting during the time up to Snap 3; and a "#" under a block indicates overwriting during the time up to Snap 4. Thus, for example, blocks 2, 8, 11, and 19 after Snap 1 are overwritten during the Snap 2 period; blocks 8 and 14 of the Snap 2 write are overwritten during the Snap 3 period, as well as blocks 8 and 17, such that block 8 will have been overwritten twice—block 8 in cl2 is logically overwritten and appears in cl5 of Snap 2, but then that too is overwritten when block 8 is logically overwritten into cl7 of Snap 3; blocks 17, 28, and 29 written during Snap 3 are overwritten during the Snap 4 period, as well as block 18 from the Snap 1 write (block 17 having been overwritten after both Snap 3 and Snap 4). The bottom row of FIG. 3 shows the state of the various blocks at the end of the Snap 4 period, that is, of the active vDisk at that time. The shading/hatching of the blocks in the "Active" vDisk row indicates the most recent (over-)writing of each block.

The snap 1 writes may be placed in the host's write buffer 116. A write-back process may then pull the blocks from there in sorted order, pack them into clumps and write the clumps out to containers.

Note that although the blocks in the clumps are sorted in LBA order, they do not necessarily represent contiguous ranges. Clump cl3, for example, includes blocks 10, 11, 17, 18, and 19. The clumps may have a variable number of blocks in them. Some of the blocks written during snap 1 are overwritten during later snapshots. Block 2 in cl1, for example, is overwritten during snap 2.

Over time, the clumps get fragmented in the sense that old clumps may include blocks that have been logically overwritten, that is, a new write stores a new version of a block at the same LBA in the vDisk or other object in the storage system. Because clumps are preferably write-once, these overwrites end up in new clumps and are not inserted into existing clumps. The block in the original clump becomes part of an inactive snapshot or even completely obsolete. Thus, only a fraction of such a clump may still be part of the active vDisk image. For example, by the time snapshot 4 is created, clump cl3 has only one remaining block, block 10, in the active vDisk. (Blocks 11 and 19 were overwritten in snap 2, block 17 was overwritten in snap 3, and block 18 is overwritten in snap 4, in which block 17 is also overwritten again.) The other inactive blocks waste space in the cache. They also would waste bandwidth if they were loaded as part of pre-fetching for cache availability. Furthermore, they cause poor spatial locality in that a sequential read of the vDisk would result in accesses to many different clumps spread over different containers and therefore resulting in many inefficient disk accesses and poor performance.

To counteract this natural fragmentation process, DCL proactively manages the set of clumps for a vDisk. A clump-cleaning process recognizes when a logical sequence of blocks has poor locality, for example, by finding that the number of clumps referenced within some LBA range is above a threshold. FIG. 4 shows how blocks could be repacked into new clumps. This example shows what would happen if the blocks were repacked just after snapshot 4 is created and assuming snapshot 1 had already been deleted so blocks needed only by snapshot 1 are "dead".

The example also assumes a very aggressive repacking policy that repacks all clumps that have any fragmentation. In practice, the repacking policy would likely have a less aggressive threshold. In different embodiments, different conditions may be used to trigger repacking. One triggering criterion is poor block locality. Other triggering criteria could be, for example, that a new snapshot has been made, or some threshold number of snapshots. Another alternative might be that a percentage of the cache is being used, such that the system may try repacking as a way to reduce demand on the cache. Yet another triggering condition might be that a new VM has been instantiated on the host, or that a VM has been removed. Still another alternative might simply be that a threshold number of writes has transpired, on the assumption that fragmentation will build up over time.

In one embodiment, the goals of the repacking process were chosen to create clumps such that:

the active vDisk has good spatial locality and few inactive blocks taking space in cached clumps, when a snapshot is deleted, entire clumps expire because they consist only of blocks that expire with that snapshot; such clumps can then be garbage-collected, at least as far as this vDisk is concerned, and all live blocks from an old clump end up in a new clump so that the old clump can expire in its entirety (no more references to the old clump in this vDisk)

In one example of a repacking process, the storage management module 400 scans through the vDisk in logical block order, including blocks retained for snapshots, and re-sorts the blocks. It groups all the blocks for the active vDisk in clumps to be repacked into one stream of new clumps. It also groups together blocks that exist only in snapshots. The snapshots will expire and be deleted according to the snapshot schedule. As each snapshot is deleted, some set of blocks will no longer be needed and therefore expire because they are only referenced by that snapshot. The repacking process groups together blocks that will expire around the same time into other streams of new clumps. In a sense, this repacking process takes, as input, the streams of clumps created during different snapshots, and creates, as output, multiple streams of clumps, one for the active vDisk and one for each epoch of anticipated expiration of blocks corresponding to the anticipated expiration and deletion of snapshots. Each stream of new clumps is preferentially stored in different containers.

In FIG. 4, repacking produces clumps cl12, cl13, cl14, cl15, cl16, and cl18 to capture the blocks in the active vDisk as of the conclusion of snap 4 writes. Note that clumps cl4 and cl11 already existed, had no fragmentation, and so did not need to be repacked. Meanwhile, clump cl19 holds the blocks that will expire when snapshot 2 is deleted. Similarly, clump cl20 holds the blocks that will expire when snapshot 3 is deleted. There are four blocks, 2, 8, 11, and 19 created during snap 1 that have already expired because snapshot 1 has already been deleted. These blocks had been part of cl1, cl2, and cl3, but they had all been overwritten between snaps 1 and 2. They do not need to be repacked into any new clump because there are no still-live snapshots that reference them. All the other still-live blocks from these clumps have been repacked into new clumps. Thus, there are no more references from this vDisk to any of these clumps. The space consumed by these blocks and their clumps may be reclaimed by the container garbage collector (GC). In fact, because of the aggressive repacking policy, all clumps created before the repacking except the retained clumps cl4 and cl11, can be reclaimed by container GC.

In the previous example, expired clumps are reclaimed after they have been stored. It would also be possible for the system to proactively, that is, inline, determine that a clump is a duplicate of another before it is stored and, if so, to refrain from storing it, but creating the proper link to the existing identical clump.

DMap and DCL

The DMap, or disk map, is a system component and data structure that maintains the correspondence between the offset within a vDisk/file and the clump:block that holds the data. It is the set of clump:block references for a vDisk/file. In the DVX, the DMap includes references for snapshots of the vDisk/file in addition to the references for the current, active vDisk/file.

Clump repacking depends on the system being able efficiently to:

1. determine if there is good clump locality for the blocks,
2. find all DMap references to a clump within a vDisk including in snapshots of the vDisk,
3. update DMap references to old clumps with references to the newly formed clumps.

The first is needed to know when repacking is needed. One of the key motivations for DCL is for block references to include the clump fingerprint. Blocks with the same clump fingerprint are in the same clump. Blocks with different clump fingerprints are in different clumps. Note that, although hash-based fingerprints are an efficient clump identifier that does not require parameters such as counters or specially generated ID numbers, such alternate clump identifiers could be used instead of fingerprints. Examination of DMap references reveals whether there is good clump locality. (If clumps are variable sized, the clump fingerprint or block reference may include an indication of clump size to distinguish between clumps with few references because most blocks are dead and small clumps that just don't have many blocks to reference.)

The second is needed to sort blocks to different snapshot clump streams so that clumps of snapshot-related blocks can be created just as well as clumps of the active disk. It is also necessary to ensure that there are not any residual references to a clump whose blocks have mostly been repacked. Residual references would keep the clump alive and it would not be able to be cleaned out by garbage collection. Once these references are found and the live blocks repacked, affected references must be updated to reference the new clumps, which is the third requirement.

Finding and then updating both the active vDisk and vDisk snapshots is much simpler if these references are not scattered. In particular, previous approaches of storing block references in extents of their own that span a logical range of the vDisk (termed L1, or level 1, extents in a system where the blocks references are stored in a tree of references; L1 references data blocks, L2 references L1 extents and so on up to the root of the tree) and then saving different versions of the L1 extents for different snapshots of the vDisk would spread references over many data structures typically not stored together on disk. Reading and later updating all of these data structures would cause a lot of random access and churn of these structures.

The DVX keeps the references for all snapshots together by organizing the DMap as a single set of Key-Value pairs for the whole vDisk. FIGS. 5A and 5B show such a KV (key-value) DMap for the vDisk in FIG. 3. In this example DMap (which corresponds to the vDisk in FIG. 3), the key is a tuple that includes the Logical Block Address and the ID of the snapshot during which the particular block was written. The reference is itself a tuple which includes the fingerprint of the clump (indicated here as cli for the fingerprint of clump i) and the position j of the block within the clump, j=0, 1, . . . . For example, consider block 8 (LBA 8). In snapshot 1, it was written in the second position (j=1) of clump 2, thus <cl2, 1>. Then in snapshot 2, it was written in the second position (j=1) of clump 5, thus <cl5, 1>. Finally, at the end of snapshot 4, it had also been written as the first position (j=0) of clump 7 during snapshot 3, thus <cl7,0>.

Blocks written during snap 1 have snapID=1, during snap 2, have snapID=2 and so forth. The blocks that are part of the active vDisk are the blocks with the largest snapID at any given LBA. The blocks for a given snapshot K, have the largest snapID less than or equal to K. By scanning through the entries, it is easy to see the blocks that reside in the same clump, or when blocks for the active vDisk are spread over too many clumps, where "too many" may, for example, be when more than a threshold percentage of the cache is occupied by dead blocks.

In large vDisks (or files or objects), the fragmentation may be unevenly distributed. In such cases, the system may repack only a region or LBA range of the vDisk. The system may track fragmentation on a region-by-region basis and only repack those regions which are above a fragmentation threshold. The system may also choose for repacking the regions which are most fragmented.

Clump Repacking Data Flow

The host, via the storage management module 400, preferably drives the repacking process for several reasons:

One goal of repacking is to reduce fragmentation in the host's cache so the host must end up with new clumps and must be able to clean out the old clumps.

The host has most of the live blocks from the old clumps in its cache so it can read these blocks from its cache to form new clumps, which is much more efficient that having to read such blocks from disks in the storage nodes.

The new, repacked clumps need to be added to the host's cache, which is easiest if they are created within the host.

The host may have a cache of the block references so it can read data and these cached references must be updated with the references to the new clumps.

If the DMap is maintained by a DMap manager service 365 on one of the storage nodes, then the repacking process may be a cooperation between that DMap service and the host. Alternatively, the repacking process may be performed entirely within the host.

For the repacking process, the storage management module 400, or similar code if a node-based DMap service 365 is implemented, using any preferred scheme, determines which clumps should be repacked and then evicted from the host cache 116. The first stage of the process is to scan in LBA order for all references to any of the clumps to be repacked. The process determines which output stream the referenced block should be part of: the active vDisk, or one of possibly many different snapshot streams, that is, the set of blocks that will expire at about the same time in the future as snapshots are deleted according to the snapshot schedule. (For simplicity, some systems may choose not to direct the different clumps to different streams as described, though some efficiency of later cleaning will be lost.) It may then pack this information into a recipe stream. Each entry may comprise, for example:

<LBA, snap ID>,<clump FP, block #>,<output stream ID> where the output stream is either the active vDisk, or some snapshot stream number. The actual number doesn't matter since this is just an indication of how to group the blocks. This stream of "recipes" is sent to the host for the next stage of processing or it is generated internally in the host.

The host receives this stream of recipes. It reads the relevant blocks from the indicated clumps and adds them to the indicated output stream. Blocks with the same output stream ID go together in a stream to form clumps which get written together into their own container. As the new, repacked clumps are formed, if the blocks are individually compressed, they can be copied from the old clump to the new clump without decompressing and recompressing the blocks. If the clump fingerprint is derived from the fingerprints of the blocks, and the block fingerprints are stored as part of the clump, then the fingerprint for new clumps can be computed without recomputing the fingerprint for the blocks and without having to separately retrieve the block fingerprints. Blocks destined for the active vDisk get written out in their own container and may also get added to the host cache 115. As these clumps are formed, the host generates the new reference for the block and adds this reference update information to a queue destined for the DMap service or the DMap module 165. (Alternatively, all of this may be carried out in the host.)

As containers are filled with the relevant clumps and written out so that they are stable and available should anyone try to access these newly formed clumps, the host sends the reference update stream back to the DMap service (or just updates the DMap itself if the host is maintaining the DMap). It also updates its own DMap for the active vDisk in the process. When the last reference to a particular clump has been processed, the host can evict the clump from its flash cache. The DMap service may provide a hint of which repacking recipe is the last for a given clump so there is an indication of when the clump can be evicted from the cache.

The DMap service, upon receiving the stream of new references for the blocks, updates the entries in the DMap.

Note that all of this processing is preferably in sorted order. The DMap service may then scan the DMap in sorted order to generate the repacking recipes, which means that these recipes will also be in sorted order. If the clumps are themselves packed with blocks in sorted order, blocks from them will by and large be processed in sorted order. The reference update stream may then itself be kept in sorted order using easily understood procedures. These updates then can be merged back into the DMap in sorted order. If the DMap is maintained in a structure such as a Log-Structured Merge (LSM) tree, then this stream of updates should be reasonably efficiently merged back into the DMap.

Dedupe Effectiveness of DCL

In the Deduped-Clump Layout, clumps are the granularity of dedupe, replication, etc. To achieve dedupe across multiple vDisks, each vDisk must organize its blocks into the same clumps with the same fingerprints. When a vDisk is cloned, no special procedures are required to ensure that the clones start with the same set of clumps. But, as new data are written to the many VM vDisks, the system must generate the same set of clumps when the same data are stored, post-cloning and independently, to the different vDisks.

In a large distributed system, it is not practical, or at least is expensive, for the system to check what clumps already exist and then try to leverage those existing clumps. The alternative is for the system to generate, for each vDisk, clumps using a shared data-dependent routine. Given the same data, the different hosts operating on independent vDisks should generate the same clumps. Note that this logic also extends across multiple DVX: all DVX may create some identical clumps, which means these clumps may not need to be replicated when a vDisk is replicated from one DVX to another.

The DCL approach described here will typically be most efficient where there is somewhat consistent behavior by the guest file systems, since then, duplicate blocks are likely to come mostly from duplicate multi-block files being stored into the different vDisks, and the guest file systems will generally try to lay out the blocks for such a file sequentially within their vDisk. If the guest file systems do so, then the duplicate files will result in duplicate sequences of blocks, though not necessarily at the same LBAs within the different vDisks. Given such duplicate sequences, the hosts should generate duplicate clumps. To achieve LBA-independence, the method for creating clumps should be data-dependent and independent of the LBA or the specific vDisk the clump is being created for.

Data-dependent clumps are necessarily of variable length, including a variable number of blocks. Variable length clumps would normally be a problem for a primary storage system with its random overwrites. In a log-structured system, however, that buffers up a large number of writes into a write buffer and later organizes the written blocks into clumps as it destages them to containers, the system has a natural opportunity to create variable length clumps using a data-dependent routine. Further, the clump-repacking process operates in logical block order and so is also amenable to creating variable length clumps. A simple method for determining clump boundaries may start by treating the blocks to be packed into clumps as a sequence, ordered by LBA. The goal is to break the sequence into clumps in a consistent, repeatable manner such that two different host systems, given similar sequences of blocks, will break the sequences into at least some identical clumps, regardless of the specific LBAs assigned to the blocks.

One approach is to use anchor blocks to determine clump boundaries in the sequence of blocks. An anchor clump is one which meets a data-dependent criterion. One such criterion is that a hash or fingerprint of the block has a particular bit pattern. For clumps with an average size around eight blocks, the bit pattern might, for example, be that some particular set of three bits in the fingerprint all be 0. Assuming that the fingerprint function produces block fingerprints with an even distribution over the $2^3=8$ possible combinations of the three bits, on average 1 in 8 blocks will have all three bits equal to zero and therefore be an anchor block. Further factors such as minimum and maximum clump size could force, suppress or otherwise affect some clump boundaries. The clump-boundary threshold could also be adaptive, based on compressibility of the data. Another example could be that the set of blocks could have a hash computed for each and the block within a window of blocks with a minimum or maximum hash value could be selected as the clump boundary. Other data-dependent clump formation methods are possible and may be used.

DCL Benefits

Depending on which of the features of the DCL system and method a designer chooses to include, the DCL invention described above offers several advantages over the prior art. These include:

- Proactive clump repacking, which reduces fragmentation and flash cache pollution without incurring cache misses.
- Logical layout within DMap drives repacking, which leverages an assumption that file data will be laid out sequentially. This enables data-dependent, anchor-block clump formation.
- Provides a natural mechanism for repacking blocks into clumps that will expire with some snapshot. If clumps are repacked by snapshot death, deleting a snapshot may free up whole containers of data.
- Leverages host side flash and compute for clump repacking Clump repacking may leverage host flash and CPU cycles to copy forward live blocks and thereby perform much of the work of garbage collection for a log-structured file system.

Clump references vs. block references shrink the fingerprint index by more than an order of magnitude, which may eliminate a need for a flash disk for the index.

Clump-level dedupe means fewer lookups are needed for dedupe, which reduces the load for dedupe during storage or replication.

Implementation as Executable Code

The various software components making up the embodiments of the invention, in particular, the storage management module 400 will in general be embodied as processor-executable code that is stored in a non-transitory, volatile or non-volatile storage device located within the associated node or host. Upon execution, this code will cause the respective processor(s) to perform the steps used to implement the processes that carry out the DCL functions described above. The storage management module 400 may also be provided to users in the form of a computer program product on any known non-transitory medium.

The invention claimed is:

1. A method for deduplicating data in a storage system, comprising:
   receiving, from at least one writing entity, requests for a plurality of write operations;
   wherein the plurality of write operations are for writing a corresponding plurality of received blocks to a storage object;
   creating a sequence of clumps by:
      buffering the received blocks to produce a set of buffered blocks;
      sorting the set of buffered blocks to produce a set of sorted blocks;
      establishing boundaries between sorted subsets of blocks in the set of sorted blocks;
      wherein each sorted subset of blocks established by the boundaries constitutes a clump of the sequence of clumps;
      wherein, within each clump, the sorted blocks remain in sorted order;
      wherein each clump corresponds to a range of logical block addresses;
      wherein at least one clump in the sequence of clumps includes fewer than all of the blocks that fall within the range of logical block addresses that corresponds to the clump;
      wherein establishing boundaries includes:
         determining that a first block in the set of sorted blocks qualifies as an anchor block by virtue of the first block satisfying data-dependent criterion; and
         responsive to the first block qualifying as an anchor block, establishing a boundary between the first block and a second block that is adjacent to the first block within the set of sorted blocks; and
   deduplicating at a granularity level of clumps;
   wherein deduplicating at the granularity level of clumps comprises:
      performing a comparison between a first fingerprint of a particular clump in the sequence of clumps and a second fingerprint of a previously stored clump; and
      based on the comparison, determining that the particular clump is a duplicate of the previously stored clump.

2. The method of claim 1, in which each of the buffered blocks has a same predetermined size.

3. The method of claim 1, further comprising computing the first fingerprint as a function of fingerprints of the blocks included in the particular clump.

4. The method of claim 1, further comprising:
   computing respective fingerprints for each of the data blocks in the particular clump; and
   including in a header of the particular clump the block fingerprints of the data blocks included in the particular clump.

5. The method of claim 1, in which the buffered blocks are sorted by storage object and block address within the respective storage object.

6. The method of claim 1, in which, upon sensing that at least one of the write requests involves logical overwriting of at least one previously written block by a newly write-requested block, writing the newly write-requested block to a clump other than the clump in which the previously written block was included.

7. The method of claim 6, further comprising, upon sensing a repacking condition, repacking at least two data blocks that are stored in different clumps into the same new clump.

8. The method of claim 7, further comprising individually compressing each data block in the clumps, whereby the repacking is done without uncompressing and recompressing the data blocks.

9. The method of claim 7, in which logical overwriting of blocks occurs repeatedly, such that at least one of the logically overwritten data blocks is itself logically overwritten by a further overwriting data block, further comprising creating at least one additional new clump to include the further overwriting data block.

10. The method of claim 7, further comprising determining a measure of locality of the data blocks, whereby the repacking condition is that the measure of locality is less than an acceptable fragmentation threshold.

11. The method of claim 7, in which the writing entities are virtual machines (VMs) and the storage object comprises a virtual disk.

12. The method of claim 7, in which at least one new, repacked clump comprises only blocks that have not been overwritten.

13. The method of claim 7, in which only blocks within a subrange of locations within the storage object are repacked at the same time.

14. The method of claim 7, further comprising generating at least one state snapshot of at least one of the storage objects.

15. The method of claim 14, in which at least one new, repacked clump comprises only blocks that have been overwritten but are still part of a live snapshot.

16. The method of claim 15, further comprising forming the repacked set of clumps such that the data blocks are included in the clumps in the repacked set as a function of which snapshots, if any, they are part of.

17. The method of claim 16, further comprising assigning repacked clumps to containers at least in part based on the snapshots the blocks in the respective clump are part of.

18. The method of claim 15, further comprising associating an identifier with each clump.

19. The method of claim 18, in which the identifier is a hash of the clump.

20. The method of claim 15, further comprising:
   assigning to each data block a logical block identifier; and
   determining which data blocks have not been logically overwritten by scanning a data structure that associates each logical block identifier with a most recent snapshot during which it was written, as well as with a reference to the clump in which the respective data block is located in.

21. The method of claim 7, wherein the buffered blocks are buffered in a cache, the method further comprising eliminating from the cache clumps all of whose included data blocks have been logically overwritten.

22. The method of claim 1, in which the clumps have variable length.

23. The method of claim 22, in which the clumps comprise a variable number of blocks.

24. The method of claim 7, in which the repacking occurs on a host distinct from the storage node(s).

25. The method of claim 24, in which the blocks repacked are retrieved from the cache within the host.

26. The method of claim 25, in which the new clump is stored in the cache.

27. The method of claim 25, in which the new clump is written to at least one of a plurality of storage nodes.

28. One or more non-transitory computer-readable media storing instructions for deduplicating data in a storage system, the instructions including instructions which, when executed by one or more computing devices, cause:
receiving, from at least one writing entity, requests for a plurality of write operations;
wherein the plurality of write operations are for writing a corresponding plurality of received blocks to a storage object;
creating a sequence of clumps by:
buffering the received blocks to produce a set of buffered blocks;
sorting the set of buffered blocks to produce a set of sorted blocks;
establishing boundaries between sorted subsets of blocks in the set of sorted blocks;
wherein each sorted subset of blocks established by the boundaries constitutes a clump of the sequence of clumps;
wherein, within each clump, the sorted blocks remain in sorted order;
wherein each clump corresponds to a range of logical block addresses;
wherein at least one clump in the sequence of clumps includes fewer than all of the blocks that fall within the range of logical block addresses that corresponds to the clump;
wherein establishing boundaries includes:
determining that a first block in the set of sorted blocks qualifies as an anchor block by virtue of the first block satisfying data-dependent criterion; and
responsive to the first block qualifying as an anchor block, establishing a boundary between the first block and a second block that is adjacent to the first block within the set of sorted blocks; and
deduplicating at a granularity level of clumps;
wherein deduplicating at the granularity level of clumps comprises:
performing a comparison between a first fingerprint of a particular clump in the sequence of clumps and a second fingerprint of a previously stored clump; and
based on the comparison, determining that the particular clump is a duplicate of the previously stored clump.

29. The one or more non-transitory computer-readable media of claim 28, in which each of the buffered blocks has a same predetermined size.

30. The one or more non-transitory computer-readable media of claim 28, wherein the instructions include instructions for computing the first fingerprint as a function of fingerprints of the blocks included in the particular clump.

31. The one or more non-transitory computer-readable media of claim 28, wherein the instructions include instructions for:
computing respective fingerprints for each of the data blocks in the particular clump; and
including in a header of the particular clump the block fingerprints of the data blocks included in the particular clump.

32. The one or more non-transitory computer-readable media of claim 28, in which the buffered blocks are sorted by storage object and block address within the respective storage object.

33. The one or more non-transitory computer-readable media of claim 28, wherein the instructions include instructions for: upon sensing that at least one of the write requests involves logical overwriting of at least one previously written block by a newly write-requested block, writing the newly write-requested block to a clump other than the clump in which the previously written block was included.

34. The one or more non-transitory computer-readable media of claim 33, wherein the instructions include instructions for, upon sensing a repacking condition,
repacking at least two data blocks that are stored in different clumps into the same new clump.

35. The one or more non-transitory computer-readable media of claim 32, wherein the instructions include instructions for individually compressing each data block in the clumps, whereby the repacking is done without uncompressing and recompressing the data blocks.

36. The one or more non-transitory computer-readable media of claim 32, in which logical overwriting of blocks occurs repeatedly, such that at least one of the logically overwritten data blocks is itself logically overwritten by a further overwriting data block, wherein the instructions include instructions for creating at least one additional new clump to include the further overwriting data block.

37. The one or more non-transitory computer-readable media of claim 32, wherein the instructions include instructions for determining a measure of locality of the data blocks, whereby the repacking condition is that the measure of locality is less than an acceptable fragmentation threshold.

38. The one or more non-transitory computer-readable media of claim 32, in which the writing entities are virtual machines (VMs) and the storage object comprises a virtual disk.

39. The one or more non-transitory computer-readable media of claim 32, in which at least one new, repacked clump comprises only blocks that have not been overwritten.

40. The one or more non-transitory computer-readable media of claim 32, in which only blocks within a subrange of locations within the storage object are repacked at the same time.

41. The one or more non-transitory computer-readable media of claim 32, wherein the instructions include instructions for generating at least one state snapshot of at least one of the storage objects.

42. The one or more non-transitory computer-readable media of claim 41, in which at least one new, repacked clump comprises only blocks that have been overwritten but are still part of a live snapshot.

43. The one or more non-transitory computer-readable media of claim 42, wherein the instructions include instructions for forming the repacked set of clumps such that the data blocks are included in the clumps in the repacked set as a function of which snapshots, if any, they are part of.

44. The one or more non-transitory computer-readable media of claim 43, wherein the instructions include instructions for assigning repacked clumps to containers at least in part based on the snapshots the blocks in the respective clump are part of.

45. The one or more non-transitory computer-readable media of claim 42, wherein the instructions include instructions for associating an identifier with each clump.

46. The one or more non-transitory computer-readable media of claim 45, in which the identifier is a hash of the clump.

47. The one or more non-transitory computer-readable media of claim 42, wherein the instructions include instructions for:
   assigning to each data block a logical block identifier; and
   determining which data blocks have not been logically overwritten by scanning a data structure that associates each logical block identifier with a most recent snapshot during which it was written, as well as with a reference to the clump in which the respective data block is located in.

48. The one or more non-transitory computer-readable media of claim 32, wherein the buffered blocks are buffered in a cache, wherein the instructions include instructions for eliminating from the cache clumps all of whose included data blocks have been logically overwritten.

49. The one or more non-transitory computer-readable media of claim 28, in which the clumps have variable length.

50. The one or more non-transitory computer-readable media of claim 49, in which the clumps comprise a variable number of blocks.

51. The one or more non-transitory computer-readable media of claim 32, in which the repacking occurs on a host distinct from the storage node(s).

52. The one or more non-transitory computer-readable media of claim 51, in which the blocks repacked are retrieved from the cache within the host.

53. The one or more non-transitory computer-readable media of claim 52, in which the new clump is stored in the cache.

54. The one or more non-transitory computer-readable media of claim 52, in which the new clump is written to at least one of a plurality of storage nodes.

* * * * *